(12) United States Patent
Sodagar

(10) Patent No.: US 12,034,789 B2
(45) Date of Patent: Jul. 9, 2024

(54) EXTENSIBLE REQUEST SIGNALING FOR ADAPTIVE STREAMING PARAMETERIZATION

(71) Applicant: TENCENT AMERICA LLC, Palo Alto, CA (US)

(72) Inventor: Iraj Sodagar, Los Angeles, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 18/301,826

(22) Filed: Apr. 17, 2023

(65) Prior Publication Data

US 2023/0336599 A1 Oct. 19, 2023

Related U.S. Application Data

(60) Provisional application No. 63/332,600, filed on Apr. 19, 2022.

(51) Int. Cl.
*H04L 65/612* (2022.01)
*H04L 67/02* (2022.01)

(52) U.S. Cl.
CPC .......... *H04L 65/612* (2022.05); *H04L 67/02* (2013.01)

(58) Field of Classification Search
CPC ..... H04L 67/02; H04L 65/613; H04L 65/764; H04N 21/637
See application file for complete search history.

(56) References Cited

U.S. PATENT DOCUMENTS

| 2014/0201335 | A1* | 7/2014 | Wang | H04L 65/612 709/219 |
| 2014/0207907 | A1* | 7/2014 | Wang | H04L 65/762 709/217 |
| 2016/0006817 | A1 | 1/2016 | Mitic et al. | |
| 2017/0230442 | A1* | 8/2017 | Denoual | H04L 69/22 |
| 2018/0035139 | A1* | 2/2018 | Giladi | H04N 21/2381 |

OTHER PUBLICATIONS

"Information technology—Dynamic adaptive streaming over HTTP (DASH)—Part 1: Media presentation description and segment formats"; FDIS Stage; ISO proposal; ISO/IEC 23009-1:202 (X); ISO/IEC JTC 1/SC 29/WG 3; Oct. 4, 2021; 336 pages.
"Text of ISO/IEC 23009-1 4th edition DAM 2 Alternative MPD event, nonlinear playback and other extensions"; ISO/IEC JTC 1/SC 29/WG 03, MPEG Systems Convenorship: KATS (Korea, Republic of); N0459; Serial No. 21175; Feb. 5, 2022; 44 pages.
International Search Report of PCT Application PCT/US23/65886 dated Jul. 11, 2023, 9 pages.

\* cited by examiner

*Primary Examiner* — Caroline H Jahnige
(74) *Attorney, Agent, or Firm* — Crowell & Moring LLP

(57) ABSTRACT

This disclosure generally relates to media streaming technologies and more specifically to methods and apparatuses for extensible parameterization signaling for requests of media in dynamic adaptive streaming. The various example implementations disclosed herein allow for a mechanism for a media server to signal to streaming clients which requests to the media server may be parameterized how are they parameterized. The specificity for the parameterization may be defined by a service provider and is thus made extensible.

16 Claims, 5 Drawing Sheets

EXTENSIBLE REQUEST SIGNALING FOR ADAPTIVE STREAMING PARAMETERIZATION

INCORPORATION BY REFERENCE

This application is based on and claims the benefit of priority to U.S. Provisional Application No. 63/332,600 filed on Apr. 19, 2022, which is herein incorporated by reference in its entirety.

TECHNICAL FIELD

This disclosure generally relates to media streaming technologies and more specifically to methods and apparatuses for extensible parameterization for request of media in adaptive streaming.

BACKGROUND

This background description provided herein is for the purpose of generally presenting the context of the disclosure. Work of the presently named inventors, to the extent the work is described in this background section, as well as aspects of the description that may not otherwise qualify as prior art at the effective time of filing of this application, are neither expressly nor impliedly admitted as prior art against the present disclosure.

Dynamic adaptive streaming over hypertext transfer protocol (DASH) enables flexible streaming of multimedia content over IP networks. In DASH, various types of requests may be made from a DASH client to a DASH server in order to achieve various aspects of the dynamic adaptive streaming functions and controls. Some of these types of requests may be associated with a set of parameters that the DASH server expect to receive when these requests are made from the DASH client. The expected set of parameters for each of these types of requests may be specified from the media server side. The information associated with such paramutations may be signaled from the DASH server to the DASH client for the DASH client to follow when making the requests. In current implementations, such signaling of parameterization for the requests has not been extensible.

SUMMARY

This disclosure generally relates to media streaming technologies and more specifically to methods and apparatuses for extensible parameterization signaling for requests of media in dynamic adaptive streaming. The various example implementations disclosed herein allow for a mechanism for a media server to signal to streaming clients which requests to the media server may be parameterized how are they parameterized. The specificity for the parameterization may be defined by a service provider and is thus made extensible.

In some example implementations, a method by a media streaming device for an extensible parameterization of HTTP requests for a Dynamic Adaptive Streaming over HTTP (DASH) streaming media from a content server is disclosed. The method may include sending, to a DASH service provider, an initial request for the DASH streaming media; receiving a manifest for the DASH streaming media from the content server; parsing the manifest to extract a parameterization descriptor associated with the HTTP requests; identifying from the parameterization descriptor a uniform resource identifier and one or more of a set of keys, the uniform resource identifier linking to a parameterization scheme for the extensible parameterization for the HTTP requests; determining one or more types of HTTP requests corresponding to the extensible parameterization according to the parameterization scheme and the one or more of the set of keys; for an HTTP request destined to the content server and belonging to the one or more types of HTTP requests, constructing a set of parameters according the manifest; and inserting the set of parameters into the HTTP request.

In the example implementation above, the HTTP requests comprise HTTP GET requests.

In any one of the example implementations above, the uniform resource identifier comprises a uniform resource locator (URL) or uniform resource name (URN).

In any one of the example implementations above, the one or more types of HTTP requests comprise at least one of: a media segment HTTP request type; a manifest HTTP request type; a xlink HTTP request type; a callback HTTP request type of triggering callback events; or a chaining HTTP request for chained-to manifest.

In any one of the example implementations above, the parameterization scheme comprises definition of the set of keys.

In any one of the example implementations above, determining the one or more types of HTTP requests needing parametrization comprises using the one or more of the set of keys included in the manifest and the definition of the set of keys to identify the one or more types of HTTP requests.

In any one of the example implementations above, the parameterization descriptor comprises a first parameterization selection string, the first parameterization selection string comprising the uniform resource identifier followed by the one or more of the set of keys.

In any one of the example implementations above, the parameterization descriptor further comprises a second parameterization selection string, the second parameterization selection string comprises a hard-coded identification string representing selection of a predefined type of HTTP GET requests for parameterization.

In any one of the example implementations above, at least one of the set of parameters is specified by the manifest as dynamic.

In any one of the example implementations above, the at least one of the set of parameters specified as being dynamic requires adaptive computation by the media streaming device.

Aspects of the disclosure also provide a media streaming device or apparatus including a circuitry configured to carry out any one of the method implementations above.

Aspects of the disclosure also provide non-transitory computer-readable mediums storing instructions which when executed by a media streaming device are configure to cause the media streaming device to perform any one of the method implementations above.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Streaming Over Hypertext Transfer Protocol (HTTP)

Figure 1:
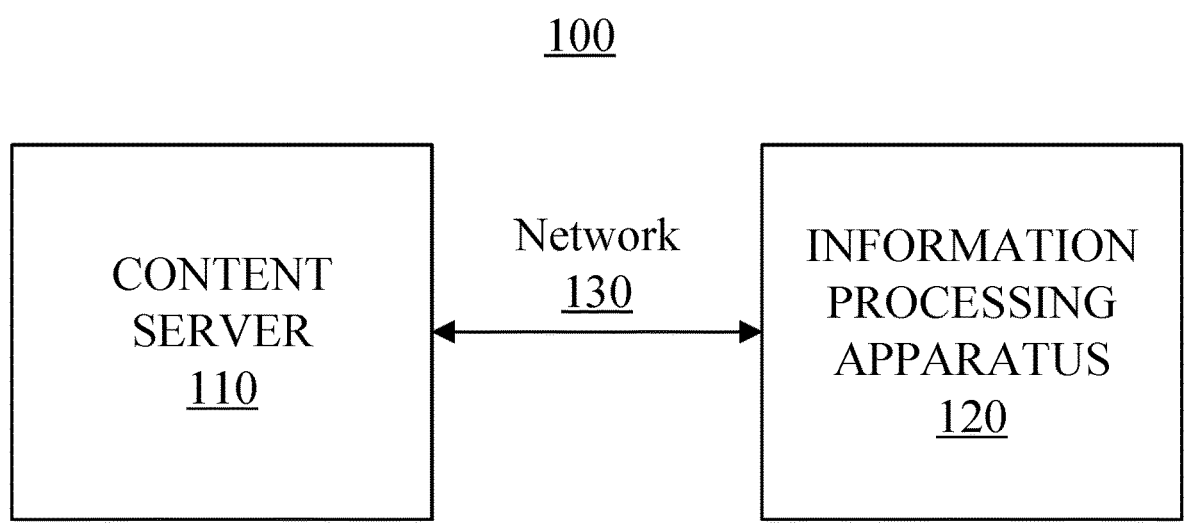
FIG. 1 illustrates a system according to an embodiment of the present disclosure.

FIG. 1 illustrates an example content distribution system 100, in which a remote information processing apparatus 120 is configured to request contents from one or more centralized or distributed content servers 110 over a communication network 130. In particular, the information processing apparatus 120 may include dedicated hardware components, software components running on general purpose hardware, or the combination thereof, which functions as a content consuming application. The content consuming application may generate one or more requests specifying the contents being requested and the characteristics of the requested contents. Each request may be constructed based on a stack of network protocols, and communicated to the content server 110 over the communication network 130. In response, the content server may generate a bitstream according to the request, package the bitstream using the stack of network protocols and communicate the bitstream packages to the content consuming application.

In some example implementations, the content may be requested at once. In other words, an entirety of a media content may be requested by the content consuming application, received, and stored locally. The locally stored content may be processed and consumed as needed (e.g., extracted, decoded, and played back) by, for example a media player, either being part of or separate from the content consuming application. Such a process may be referred to as downloading.

In some other implementations, the content may be streamed as it is being consumed rather than being downloaded for later consumption. In such implementations, the entirety of the requested content may not need to be stored in the content consuming application. Rather, only a limited amount of content is continuously received from the content server 110 on a rolling basis and managed by an in-and-out local buffer for content processing and playback. Such implementations may be referred to as streaming. While some media playback functions, such as rewinding, fast-forwarding, and seeking may involve complex media bitstream control and buffering, media streaming is usually more versatile and more suitable for distribution of contents containing timed sequences of media that are not repeated consumed.

In the disclosure below, the terms "content" and "media" may be used interchangeably. A requested content may include various information items needed for its consumption, including but not limited to the content itself and various metadata. The content itself, may further include various media components, such as different tracks, including but not limited to video components/tracks, audio components/tracks, subtitles, and the like. Metadata for describing the media content or providing additional processing information may be treated as one or more separate tracks. Such content with its metadata may be generated by the content server 120 as a bitstream that can be parsed and decoded according to a set of protocols or rules known to the content consuming application. The term "content server" in its singular form is used to represent a single server or a plurality of servers arranged in a central location or distributed over various geographical locations. Such content servers may be implemented as dedicated computing machines, or alternatively, may be constructed as virtual machines, and/or as virtually hosed in a cloud computing environment. Further in the disclosure below, the terms "information processing apparatus" (referring to 120 of FIG. 1) and "content consuming application" may be used interchangeably. These terms may also be alternatively referred to as "client," "client devices/apparatus," "playback devices/apparatus/client," and the like. While only a single information processing apparatus 120 is shown in FIG. 1, there can be a plurality of independent information processing apparatus. In other words, a set of content servers 110 may be configured to simultaneously and independently provide streaming service to a plurality of content consuming applications.

In some example implementations, contents generated for distribution by the content server 110 may be segmented to facilitate their streaming. For example, timed sequences of media contents such as movies, may be chopped into time segments, each containing a number of media frames. Each media segment may be self-contained such that its processing including, for example, parsing, decoding, and playback, does not require information for other media segments. The media contents may be pre-segmented. Accordingly, the media contents may be stored and managed by the content server 120 segment by segment. Alternatively, media segments may be generated in real-time from contiguously stored media contents as they are being requested during streaming processes. In some further implementations, the segmentation of the media may be hierarchical, containing multiple levels of segmentation.

In some particular implementations for streaming, decision as to which media segments or which portions of the media segments to request from the content server 110 may be determined by a content consuming application in real time as controlled by user play-back instructions through a user application interface. In such a manner, the content server may be configured to respond to the requests and generate or retrieve segments or portions of segments of the content with their metadata according to the requests, and deliver the segments or portions of the segments to the requesting content consuming application over the network 130.

In some example implementations, a same media track of a media content may be prepared as different versions. For example, the same movie track may be prepared in different resolutions and/or frame rate. For another example, the same movie track may be prepared in different bitrates. For another example, the same audio movie may be prepared with different sound quality and/or different number of sound channels (e.g., 5-channel sound, or 7-channel sound). Accordingly, the content consuming application may determine which version of the media tracks to stream and include such selection in its requests for media content. Such decision by the content consuming application, may be made based on one or more of a number of example factors, including but not limited to the playback capabilities of the information processing apparatus 120 (e.g., display resolution, decoding speed, processing power, buffer size, and the like), the network bandwidth and throughput, and the like. As such, the streaming session may be adapted among different media consuming applications according to their device capabilities. A streaming architecture so configured may be referred to as adaptive streaming. The streaming process may further be adaptive within each media consuming application in that different versions of the media tracks may be selected and requested at different times during a streaming session, according to, for example, a real-time network condition (for example, bandwidth and throughput, and bitrate supported by the network bandwidth). A streaming architecture so configured may be further referred to as dynamic adaptive streaming. In particular, a streaming architecture configured to adapt to bitrates of the media content may be referred to as dynamic adaptive bitrate streaming.

In some example implementations, a request for a particular version of segments or portions of segments of media content by the content consuming application in dynamic adaptive streaming may be constructed based on a media manifest according to the progression of the streaming session. The term "manifest" may be used to represent any collection of information items that describe the media content, including the segmentation, versions, network locations, and any other information that may be needed for any content consuming application to determine how and what to request at different times during a streaming session. A manifest may be generally referred to as a "media presentation description" (MPD).

Such a manifest may be prepared on the content server side at the time when a particular media content is created or generated. Such a manifest may be requested by the content consuming application and received from the content server at the beginning of a streaming session. The content consuming application may further request any update of the manifest during the streaming session. Such manifest may be used by the content consuming device as a blueprint for constructing the subsequent requests of particular version of segments or portions of segments of the media content during the streaming session.

In some example implementations, the media server may be configured to function similarly to a web server from the stand points of external applications. As such, a request for a media manifest and/or for media segments or portions of media segments by a content consuming application may be made based on, for example, the hypertext transfer protocol (HTTP). As such, a request may be constructed as a URL and the requested content may be delivered as a response to the HTTP request from the content server.

Details for the manners in which the manifests are specified, the contents are segmented, organized, and versioned, and the HTTP requests are constructed may depend on specific adaptive streaming protocol, such as Dynamic Adaptive Streaming over HTTP (DASH), HTTP Live Streaming (HLS), Smooth Streaming Transport Protocol (SSTP), and the like. The various additional example implementations below may be described in the context of DASH. However, the underlying principles are applicable to any type of adaptive streaming over HTTP. Further, the underlying principles are applicable to media content request mechanism based on network protocols other than HTTP.

Dynamic Adaptive Streaming Over HTTP (DASH)

One example protocol for implementing adaptive media streaming includes Dynamic Adaptive Streaming over Hypertext transfer protocol (DASH). As described above, DASH represents one of the adaptive bitrate streaming implementations that enables streaming of media content using content delivery networks (CDNs) based on hypertext transfer protocol (HTTP) infrastructures, including content servers configured as web servers with various proxies and caches, and the like. Such content servers may be referred to as DASH servers. The content consuming applications described above may accordingly be referred to as DASH clients.

DASH supports live streaming from a DASH server to a DASH client, and allows the DASH client to control a streaming session, so that the DASH server does not need to cope with an additional load of stream adaptation management in large scale deployments. As described above, DASH also allows the DASH client a choice of streaming from various DASH servers, thereby achieving further load-balancing of the network for the benefit of the DASH client. DASH further provides dynamic switching between different media versions of the media tracks, for example, by varying bitrates to adapt to network conditions and processing capability of a DASH client.

In DASH, the media manifest described above may be particularly referred to as an MPD (even though the term MPD may be generally used to refer to manifest of any type in adaptive streaming systems other than the ones based on DASH). For example, an MPD in DASH may be constructed as a file that is downloadable in full or in part by a DASH client and that provides information items used by the DASH client to stream the media content by selectively and adaptively requesting streaming media segments from the DASH server.

An MPD may be constructed in various formats. For example, an MPD may be constructed in the form of an Extensible Markup Language (XML) document or file. The MPD file may be requested and delivered to the DASH client. The MPD file may be requested by HTTP via, for example, an HTTP GET request. The MPD file may be delivered entirely at the beginning of a streaming session. Alternatively, the MPD file can be fragmented and delivered in parts. As such, parts of the MPD file may be requested and delivered prior to the start of the streaming and other parts of the MPD file may be requested and delivered later to reduce session start-up delay (such that the streaming can begin with the earlier media segments without having to wait for information items pertaining to later segments of the media). The MPD file can also be updated during the streaming session (e.g., with the segment information that is needed but is not yet retrieved).

In some example implementations, the MPD file describes the segmentation of the media content, the organization of the segments, and available versions of the segments. The MPD may support expression of content accessibility features, ratings, camera views, metadata, and the like. DASH may also support delivery of multi-view and scalable coded content.

In some example implementations, an MPD file may contain a sequence of descriptions for one or more periods along a media consumption timeline (e.g., play time of a video content). Each of the one or more periods may be defined by, for example, a "period" information element tag in the MPD file. The media content may be indicated by the MPD file as organized in a plurality of continuous periods in time. The MPD file may identify a start time for each of the periods in the playback timeline. The start time may be defined as an absolute start time from a beginning of the media content or as a relative offset from other reference point in the playback timeline.

In some example implementations, for each media period, the MPD file may further specify one or more adaptations sets. Different adaptation sets may be specified to capture different combinations (or subset) of one or more of the media components. For example, video and audio can be different adaptation sets. Different versions of audios (stereo audio or multi-channel audio) may be different adaptation set. Audio of different language may be different adaptation sets. In one particular example, the MPD file may specify that each period contains one video adaptation set, multiple audio adaptation sets, one for each of the supported languages. Adaptation sets may also contain subtitles or arbitrary metadata.

In some example implementations, adaptation sets of a particular period may be assigned to a group indicated by a group attribute in the MPD file. Adaptation sets in the same group are generally considered alternatives to each other. For example, each adaptation set of video data for a particular period can be assigned to the same group, such that any adaptation set can be selected for video data of the multimedia content for the corresponding period. The media content within one period can be from either one adaptation set, or a combination of adaptation sets, with each group contributing at most one adaptation set.

In some example implementations, each adaptation set may be specified by the MPD file as containing one or more representations for the same media component for the corresponding period. A representation, for example, can be one of a number of alternative encoded versions of audio or video data. The representations can differ by encoding types, e.g., by bitrate, resolution, and/or codec for video data, and bitrate, and/or codec for audio data. The term representation can be used to refer to a section of encoded media data corresponding to a particular period of the multimedia content and encoded in a particular way to achieve a certain range of average bitrate. In some examples implementations, for each representation in an adaptation set, the MPD file may specify attributes of the representation including but not limited to video/audio type, video/audio codecs, video frame width in pixels, video frame height in pixels, video/audio frame rate, and bandwidth (representing average encoded bitrate).

Each representation of an adaptation set may also include one or more media components depending the combination of media components included in the adaptation set. Each media component in a representation may correspond to an encoded version of one individual media type, such as audio, video, or timed text (e.g., for closed captioning). Media components can be time-continuous across boundaries of consecutive media segments within one representation.

In some example implementations, a representation may include one or more segments. Each representation can include an initialization segment, or each segment of a representation can be self-initializing. When present, the initialization segment can contain initialization information for accessing the representation. In some cases, the initialization segment does not contain media data. Segments that contain media data may represent the time-segmented contents. Segments between different representations may be aligned in time. For each media segment, the MPD file may include a unique identifier. Such an identifier, when combined with a basis URL, a base URN, or base uniform resource identifier (URI), may form a unique URL, URN or URI that represents a network location of the media segment, which may be included in an HTTP request for this media segment and be used by the content server to locate the requested segment for delivery.

For example, a URL for requesting a media segment can be defined as an <absolute-URI>, with a fixed scheme of "http" or "https", possibly further supplemented by a byte range if a range attribute is provided together with the URL. The byte range can be expressed to identifying a contiguous range of bytes in the segment.

In some further example implementations, sub-representations may be specified and described in the MPD file as being embedded (or contained) in regular representations using, for example, a Sub-Representation element/indicator. The sub-representation element may be used to describe properties of one or several media content components that are embedded in the representation. For example, the sub-representation element may be used to describe properties of an embedded audio component (e.g., codec, sampling rate, etc.), an embedded sub-title (e.g., codec), or the sub-representation element may be used to describe some embedded lower quality video layer (e.g., some lower frame rate, etc.). Sub-representation and representation elements can share some common attributes and elements.

In some example implementations, the DASH client may be configured to access, download, and request an entirety or a portion of the MPD file from the DASH server. That is, the DASH client may retrieve the MPD file for use in initiating a live streaming session. Based on the MPD file, and selection of a representation, the DASH client can make several further decisions, including determining what is the latest segment that is available on the server, determining the segment availability start time of the next segment and possibly future segments, determining when to start playback of the segment, and determining when to get/fetch/request a new MPD file.

In some example implementations, the MPD may further include information about DASH events in order to signal aperiodic information to DASH clients or DASH applications. Events may be timed, starting at a specific media presentation time with a duration. Additionally or alternatively, the event information may include control messages for a media player that are associated with specific times during playback of the media presentation, such as advertisement insertion cues. Media that may be inserted during streaming may be provided from separate servers, such as an advertisement server. In addition to signaling the events by MPD separately from the media representations, events may also be multiplexed in-band in a selected media representation in one or several selected adaptation sets only, or in all representations.

Figure 2:
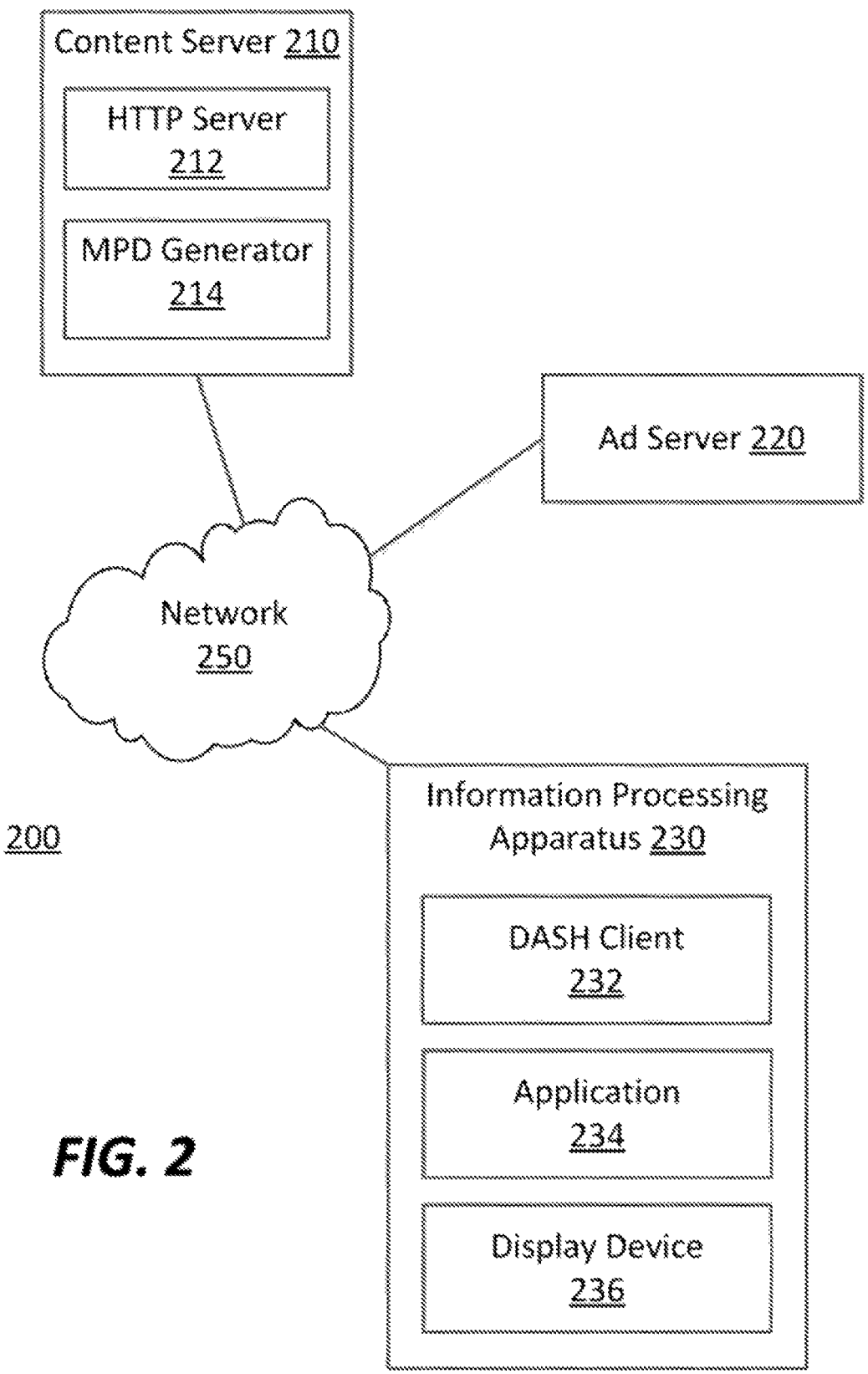
FIG. 2 illustrates a Dynamic Adaptive Streaming over HTTP (DASH) system according to an embodiment of the present disclosure.

An exemplary DASH system 200 is illustrated in FIG. 2. The DASH system 200 may include one or more centralized or distributed content servers 210 and an information processing apparatus 230 which are connected by a network 250. The DASH system (200) may also include one or more supplemental content servers such as one or more advertisement server 220.

The content server 210 may provide primary content (e.g., a main program) and an MPD for the content, to the information processing apparatus 230. The manifest file can be generated by an MPD generator 214. The primary content and the manifest file can be provided by a same sever or different servers.

The information processing apparatus 230 may include a DASH client 232 that directly communicate with the content server 210. The DASH client 232, controlled by a DASH application 234 of the information processing apparatus 230, may request and/or receive the MPD and may request and acquire primary content from an HTTP server 212 of the content server 210 based on the MPD. The MPD may be processed by the DASH client 232. Further, the DASH client 232 may acquire advertisement content from the advertisement server 220, or other content (e.g., interactive content) from one or more supplemental content servers according to DASH events. The main content and the advertisement content can be processed by the DASH client 232 and the DASH application 234 and output for display on a display device 236 of the information processing apparatus 230. The display device 236 may be integrated with, or external to, the information processing apparatus 230. Further, the DASH client 232 may extract other event information from one or more timed metadata tracks and send the extracted event information to the DASH application 234 for further processing. The DASH application 234 may be configured, for example, to display supplemental content based on the event information.

Figure 3:
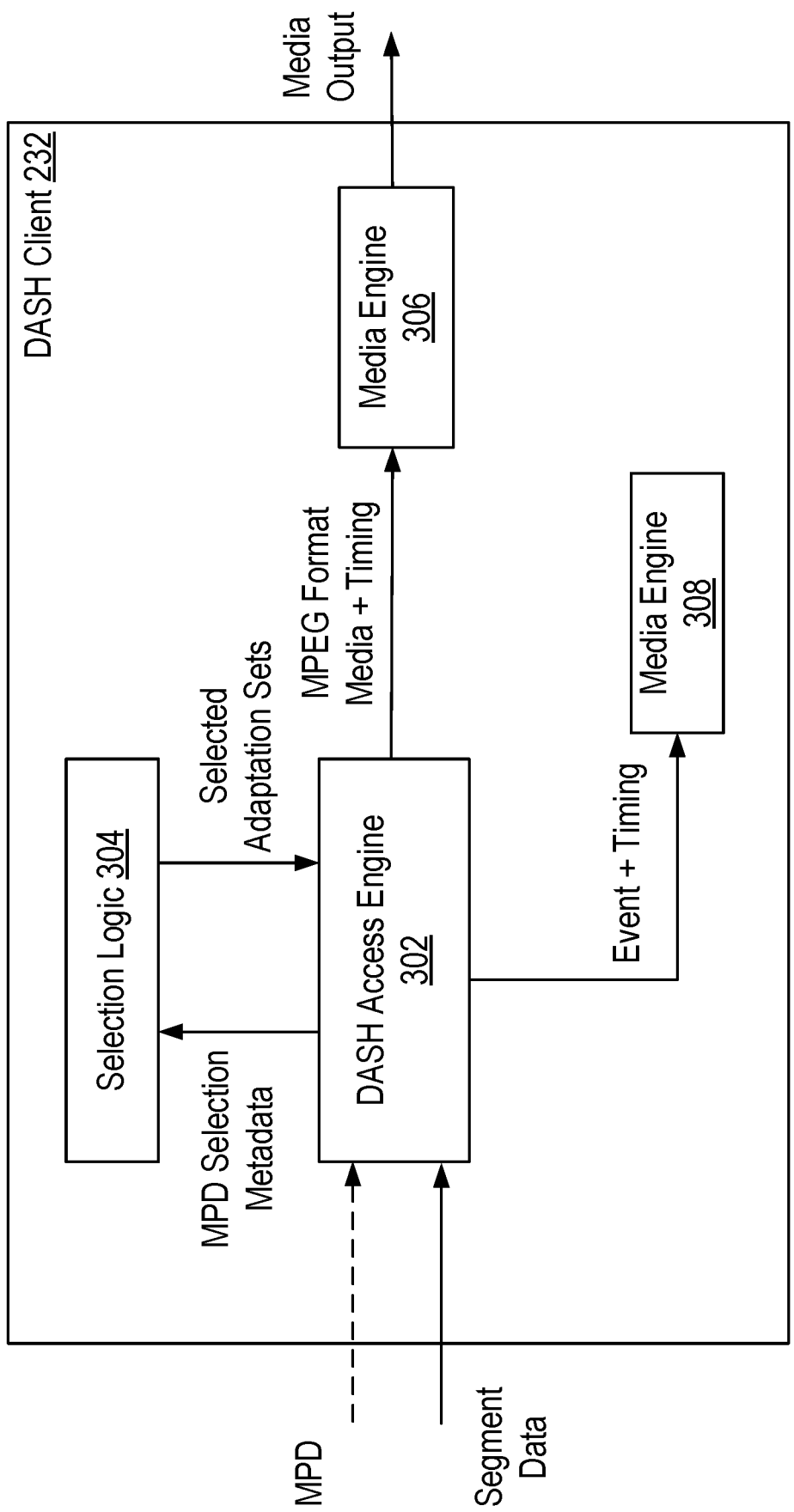
FIG. 3 illustrates a DASH client architecture according to an embodiment of the present disclosure.

An example for the DASH client 232 is illustrated in FIG. 3. As shown in FIG. 3, the example DASH client 232 may include a DASH access engine 304, a selection logic 302, and media engines 306 and 308. The DASH access engine 302, for example, may be configured to communicate with the content server for retrieving a portion of or an entirety of the MPD of the streaming media, and for requesting and retrieving segment data of the dynamically requested streaming media as well as for requesting supplemental media (advertisement) according to MPD DASH events. The selection logic 304 may be configured to determine the next one or more segments to request including selection of adaptation sets and representations. Such decision for example, may be determined by user instructions as well as by other real time information such as the network bandwidth and throughput. The media engines 306 may be configured to process the segment data received by the DASH access engine 302 according to a format of the media segments (e.g., MPEG) and timing of the media segments to generate main media output. The media engine 308 may be configured to process media content associated with timed DASH events from the DASH Access Engine 302 to generate supplemental media output (such as advertisement), which, for example, may be inserted into the main media output.

Parameterization of Requests

As described above, in dynamic adaptive streaming, interactions between a streaming client such as a DASH client and content servers may be communicated over a communication network via HTTP. The content servers may thus be considered essentially by streaming clients as web servers. For example, requests for various information items from the content servers by the streaming client may be made using HTTP GET method addressed to URL destinations.

Such requests by a streaming client may be made for various different purposes and designed for requesting distinct information items. For example, an HTTP GET request may be used for retrieving one or more media segments or portions of one or more media segments. For another example, an HTTP GET request may be used for retrieving MPD information (e.g., at the fetch time, or afterwards during streaming), for determining MPDs that are chained to, for requesting fallback to alternative MPDs, for requesting Xlink resolution, for triggering various DASH callback events, and/or for requesting Session Based Documents (SBD).

In some implementations of HTTP GET requests for media segments, for example, the MPD may provide a template for constructing URLs from a base URL for requesting particular media segments from an adaptation set. Such a template, for example, may specify manners in which a base URL may be appended to generate a more complete URL for requesting a particular media segment or a byte range of a particular media segment. For example, the template may specify that the base URL may be appended with segment index, byte range, and/or bitrate (which correlates with particular representations of the media within the adaptation set) in a particular order and format.

In some further example implementations, an HTTP GET request may be associated with a set of parameters that may be further inserted in the HTTP request so that a content server can adapt its action/response to the request. Whether a set of parameters should be inserted and what parameters should be inserted may also be specified in the MPD and signaled to the streaming clients.

For example, for HTTP requests for media segments, a parameterization descriptor may be optionally included in the MPD to signal to the streaming clients that a media segment request may be associated with a set of parameters that the content servers expect the streaming client to insert into their HTTP GET requests for media segments. The parameterization descriptor may include one or more elements that may be configured in the MPD to specify what parameters are expected to be inserted by the streaming client into an HTTP GET request for media segment(s), how these parameters are to be generated, and the format and order of the parameter insertion.

While some of these parameters may be static, in some implementations, some other parameters specified in the parameter descriptor of the MPD may be dynamic, requiring client-side computations for its generation. Dynamic parameters of such types thus provide further adaptability for the streaming. For example, an MPD may specify a parameter for the media segment request that represents a geographic location of the streaming client. Such a parameter, when inserted in the HTTP GET request for media segments, may be advantageously used by the content server to identify closest content repository for the requested main media segments and appropriate adaptively insertable local media (e.g., local advertisement). As such, flexible and dynamic parameterization mechanisms may be provided. Such request parameters may be instantiated and constructed as name-value pairs by streaming clients.

The parameterization descriptor for media segment requests above may be referred to as an MPD data structure of a "UrlQueryInfoType". An instantiated data structure of such a type in an MPD, referred to as "UrlQueryInfo", may contain various attributes or descriptors that are used to provide the static as well as dynamic parameterization mechanism as described above in HTTP GET requests for media segments. In some further example implementations, such a static and dynamic parameterization mechanism may be extended to other types of HTTP requests in addition to requests for media segments. An example syntax for an extension data structure type may be specified and may be used to instantiate an MPD containing a corresponding data structure for signaling and prescribing parametrization of the various types of HTTP GET requests. Such extension data structure type may be referred to as "ExtendedUrlInfoType". A data structure of such a type, referred to as "ExtendedUrlInfo", if instantiated and included in an MPD, may signal to the streaming client that the extended parameterization is to be applied. An example syntax for a data structure of "ExtendedUrlInfoType" may include various example attributes or descriptors as shown in Table 1.

TABLE 1

Example Syntax for ExtendedUrlInfoType MPD Data Structure

| Element or Attribute Name | Use | Description |
|---|---|---|
| ExtendedUrlInfoType | | provides information for derivation of parameter string. This is an extension of UrlQueryInfoType element. |
| @includeInRequests | OD (default: "segment") | specifies which HTTP GET requests shall carry parameters. Value is a white spaced concatenated list of the following keys:<br>1) "segment" (all segment requests)",<br>2) "xlink" (all XLink resolution requests),<br>3) "mpd" (all MPD requests),<br>4) "callback" (all requests triggered by DASH callback events),<br>5) "chaining" (requests for chained-to MPDs,<br>6) "fallback" (requests for the alternative MPDs.<br>Default value is "segment", i.e. parameters will be only sent with segment requests<br>NOTE Depending on the actual element used, parameter output goes either to query parameters (for ExtUrlQueryInfo) or HTTP headers (for ExtHttpHeaderInfo) |
| @headerParamSource | OD (default: "segment") | specifies HTTP responses from which HTTP header values, identified by the template $header:header-name$, should be extracted from. Value is a white spaced concatenated list of the following keys:<br>1) "segment" (all segment requests)",<br>2) "xlink" (all XLink resolution requests),<br>3) "mpd" (all MPD requests),<br>4) "callback" (all requests triggered by DASH callback events).<br>Default value: empty string (no header parameters inspected)<br>If this attribute is present then: (a) @queryTemplate attribute shall be present and shall contain the $header:<header-name>$ identifier, and (b) neither @useMPDUrlQuery nor @queryString attribute shall be present. |
| @sameOriginOnly | OD | specifies that parameters must only be sent to the same origin they were instantiated from. In case of HTTP headers as source, the origin is defined as the origin of the HTTP request identified by the attribute @headerParamSource. In case the parameters are instantiated from the MPD or from the MPD URL, the origin is defined in both case by the MPD URL.<br>Two origins are the same as having same scheme/host/port triple<br>Default value: false (no origin restrictions) |

Key
For attributes: M = mandatory, O = optional, OD = optional with default value, CM = conditionally mandatory.
For elements: <minOccurs> ... < maxOccurs> (N = unbounded)
The conditions only hold without using xlink:href. If linking is used, then all attributes are "optional" and <minOccurs = 0>.

In the example syntax of Table 1, an MPD data structure of the "ExtendedUrlInfoType" may be instantiated in the MPD. Such an instantiated data structure, referred to as "ExtendedUrlInfo" may be used in the MPD as a parametrization descriptor for the various types of HTTP Get requests, and according to Table 1, may include several data elements or descriptors. A first data element, referred to as "@includeInRequests", may be included to inform the streaming client which ones of a predefined list of types of HTTP GET requests, when submitted by the streaming client, are expected by the content server to be inserted with parameters. The list of request types may include all HTTP GET request types that can be parameterized. For example, the list may include (1) media segment request type, (2) xlink request type (for reference to remote locations for fetching information), (3) MPD request type (for fetching MPD), (4) callback request type (for triggering call back events), (5) chaining request type (for requesting chained-to MPD), and (6) fallback request type (for requesting alternative MPDs).

In the example format specified in Table 1, a value for the "@includeInRequests" element of the instantiated parameterization descriptor may be a white spaced concatenated list of any combination of key strings (or keys) representing the various types of HTTP GET requests. In an example implementation, the 6 parametrizable HTTP GET request types above may be represented by the key strings of "segment", "xlink", "mpd", "callback", "chaining", and "fallback". For example, a data element under the instantiated "ExtendedUrlInfo" specified as "@includeInRequests=segment mpd" would signal to the streaming client that among the various HTTP GET request types, segment requests and MPD requests are to be inserted with parameters associated therewith. A default value for "@includeInRequests" may be provided (e.g., "segment") when "ExtendedUrlInfo" is instantiated but "@includeIn-Requests" data element is not present.

Other data elements of "ExtendedUrlInfo", such as "@headerParamSource" and "@sameOriginOnly", may also be included. Together with other data elements of "UrlQueryInfo" parametrization descriptor above, specifies to the streaming the sources of the parameters and how should the final parameter for a particular request be constructed. Some example details are provided above in Table 1.

In the example implementations specified in Table 1, parameters for a particular request, once generated or output by the streaming client, may be used as query parameters in the HTTP GET request. In some other implementations, another parameterization descriptor type in parallel with "ExtendedUrlInfoType", referred to as "ExtHttpHeaderInfoType" may be specified. When a parameterization description of such a type is instantiated, parameters for the various requests may be similarly constructed as described above, but may be output in the streaming client to HTTP headers.

As also shown in the example implementation of Table 1, the choices as values for "@includeInRequests" are hard-coded with specific strings, e.g., "segment" for segment HTTP GET requests and "xlink" for xlink HTTP GET requests. Each time an additional type of request is added to the list, the syntax specification of Table 1 would need to be updated. For example, when parameterization is extended to HTTP requests for SBD documents, the syntax definition of Table 1 may need to be updated, as shown in Table 2.

TABLE 2

Another Example Syntax of ExtendedUrlInfoType MPD Data Structure

| Element or Attribute Name | Use | Description |
|---|---|---|
| ExtendedUrlInfoType | | provides information for derivation of parameter string. This is an extension of UrlQueryInfoType element. |
| @includeInRequests | OD (default: "segment") | specifies which HTTP GET requests shall carry parameters. Value is a white spaced concatenated list of the following keys:<br>1) "segment" (all segment requests)",<br>2) "xlink" (all XLink resolution requests),<br>3) "mpd" (all MPD requests),<br>4) "callback" (all requests triggered by DASH callback events),<br>5) "chaining" (requests for chained-to MPDs,<br>6) "fallback" (requests for the alternative MPDs.<br>7) "sbd" (requests for the SBD document)<br>Default value is "segment", i.e. parameters will be only sent with segment requests.<br>NOTE Depending on the actual element used, parameter output goes either to query parameters (for ExtUrlQueryInfo) or HTTP headers (for ExtHttpHeaderInfo). |
| @headerParamSource | OD (default: "segment") | specifies HTTP responses from which HTTP header values, identified by the template $header:header-name$, should be extracted from. Value is a white spaced concatenated list of the following keys:<br>1) "segment" (all segment requests)",<br>2) "xlink" (all XLink resolution requests),<br>3) "mpd" (all MPD requests),<br>4) "callback" (all requests triggered by DASH callback events).<br>5) "sbd" (requests for the SBD document)<br>Default value: empty string (no header parameters inspected)<br>If this attribute is present then: (a) @queryTemplate attribute shall be present and shall contain the $header:<header-name>$ identifier, and (b) neither @useMPDUrlQuery nor @queryString attribute shall be present. |
| @sameOriginOnly | OD | specifies that parameters must only be sent to the same origin they were instantiated from. In case of HTTP headers as source, the origin is defined as the origin of the HTTP request identified by the attribute @headerParamSource. In case the parameters are instantiated from the MPD or from the MPD URL, the origin is defined in both case by the MPD URL.<br>Two origins are the same as having same scheme/host/port triple.<br>Default value: false (no origin restrictions) |

Key
For attributes: M = mandatory, O = optional, OD = optional with default value, CM = conditionally mandatory.
For elements: <minOccurs> . . . <maxOccurs> (N = unbounded)
The conditions only hold without using xlink:href. If linking is used, then all attributes are "optional" and <minOccurs = 0>.

As such, the above implementations shown by Table 1 and Table 2 may not be extensible. In some other example implementations, an extensible approach may be adopted as shown in Table 3. An approach or scheme is considered extensible in the context above when new types of requests are introduced, the parameterization syntax would not need to be updated. As shown in Table 3, for achieve extensible parameterization, rather than using hard-coded string values for "@includeInRequests", a URI string may be used instead.

TABLE 3

Example Extensible ExtendedUrlInfoType MPD Data Structure

| Element or Attribute Name | Use | Description |
| --- | --- | --- |
| ExtendedUrlInfoType | | provides information for derivation of parameter string. This is an extension of UrlQueryInfoType element. |
| @includeInRequests | OD (default: "segment") | specifies which HTTP GET requests shall carry parameters. Value is a white spaced concatenated that starts with a URN or URL, followed by zero or more keys defined by that URN or URL. The keys are defined by the URN/URL scheme owner. The URN/URL owner also defines which HTTP requests shall add array parameters using those keys. |
| @headerParamSource | OD (default: "segment") | specifies HTTP responses from which HTTP header values, identified by the template $header:header-name$, should be extracted from. Value is a white spaced concatenated that starts with a URN or URL, followed by zero or more keys defined by that URN or URL. The keys are defined by the URN/URL scheme owner. The URN/URL owner also defines which HTTP requests shall add header extensions using those keys. |
| @sameOriginOnly | OD | specifies that parameters must only be sent to the same origin they were instantiated from. In case of HTTP headers as source, the origin is defined as the origin of the HTTP request identified by the attribute @headerParamSource. In case the parameters are instantiated from the MPD or from the MPD URL, the origin is defined in both case by the MPD URL. Two origins are the same as having same scheme/host/port triple. Default value: false (no origin restrictions) |

Key
For attributes: M = mandatory, O = optional, OD = optional with default value, CM = conditionally mandatory.
For elements: <minOccurs> . . . <maxOccurs> (N = unbounded)
The conditions only hold without using xlink:href. If linking is used, then all attributes are "optional" and <minOccurs = 0>.

As shown in Table 3, a URN such as "urn:mpeg:dash:annexi:parameters:2022" may be defined and used along with optional substrings defined by owner(s) of the URN/URL scheme. For example, the following strings may be defined by the URN/URL owner along with the URN/URL to signal the desired HTTP GET requests for parameterization:

1) "segment" (all segment requests)",
2) "xlink" (all XLink resolution requests),
3) "mpd" (all MPD requests),
4) "callback" (all requests triggered by DASH callback events),
5) "chaining" (requests for chained-to MPDs,
6) "fallback" (requests for the alternative MPDs,
7) "sbd" (requests for SBD document).

For example, the value of the Attribute for adding parameters to the segment and MPD's HTTP GET requests may be: @includeInRequests="urn:mpeg:dash:annexi:parameters:2022 segment mpd."

The list of string definitions can be expanded or extended by the URN/URL owners to different types of HTTP GET requests without having to modify the specification of Table 3.

Another example implementation to maintain a compatibility of Table 3 with Table 2 is shown in Table 4.

TABLE 4

Modified Example Syntax for ExtendedUrlInfoType MPD Data Structure

| Element or Attribute Name | Use | Description |
| --- | --- | --- |
| ExtendedUrlInfoType | | provides information for derivation of parameter string. This is an extension of UrlQueryInfoType element |
| @includeInRequests | OD (default: "segment") | specifies which HTTP GET requests shall carry parameters. Value is a white spaced concatenated list of the following keys:<br>1) "segment" (all segment requests)",<br>2) "xlink" (all XLink resolution requests),<br>3) "mpd" (all MPD requests),<br>4) "callback" (all requests triggered by DASH callback events),<br>5) "chaining" (requests for chained-to MPDs,<br>6) "fallback" (requests for the alternative MPDs.<br>7) "sbd" (requests for the SBD document)<br>8) a URN or URL with white spaced zero or more subkeys. The subkeys are defined by the URN/URL scheme owner. The URN/URL owner also defines which HTTP requests shall add array parameters using those subkeys.<br>The URN and its keys shall be the last item in the white-spaced keys above. |
| @headerParamSource | OD (default: "segment") | specifies HTTP responses from which HTTP header values, identified by the template $header:header-name$, should be extracted from. Value is a white spaced concatenated list of the following keys:<br>1) "segment" (all segment requests)",<br>2) "xlink" (all XLink resolution requests),<br>3) "mpd" (all MPD requests),<br>4) "callback" (all requests triggered by DASH callback events),<br>5) "sbd" (requests for the SBD document)<br>6) a URN or URL with white spaced zero or more subkeys. The subkeys are defined by the URN/URL scheme owner. The URN/URL owner also defines which HTTP requests shall add header extensions using those subkeys.<br>The URN and its keys shall be the last item in the white-spaced keys above. |
| @sameOriginOnly | OD | specifies that parameters must only be sent to the same origin they were instantiated from. In case of HTTP headers as source, the origin is defined as the origin of the HTTP request identified by the attribute @headerParamSource. In case the parameters are instantiated from the MPD or from the MPD URL, the origin is defined in both case by the MPD URL.<br>Two origins are the same as having same scheme/host/port triple.<br>Default value: false (no origin restrictions) |

Key
For attributes: M = mandatory, O = optional, OD = optional with default value, CM = conditionally mandatory.
For elements: <minOccurs> . . . < maxOccurs> (N = unbounded)
The conditions only hold without using xlink:href. If linking is used, then all attributes are "optional" and <minOccurs = 0>.

In the example scheme of Table 4, hard-coded strings values for "@includeInRequests" representing common HTTP GET request types for parameterization, such as the ones in Table 2, may be specified. Additionally, a URN such as "urn:mpeg:dash:annexi:parameters:2022" may be defined and used along with optional substrings defined by owner(s) of the URN/URL scheme for representing a new type of HTTP GET requests. For example, the value of the attribute/descriptor for adding parameters to the segment and MPD's HTTP GET requests and a new type of HTTP GET request ("newRequest") specified as requiring parameterization may be: @includeInRequests="segment" "mpd" "urn:mpeg:dash:annexi:parameters:2022 newReques".

Figure 4:
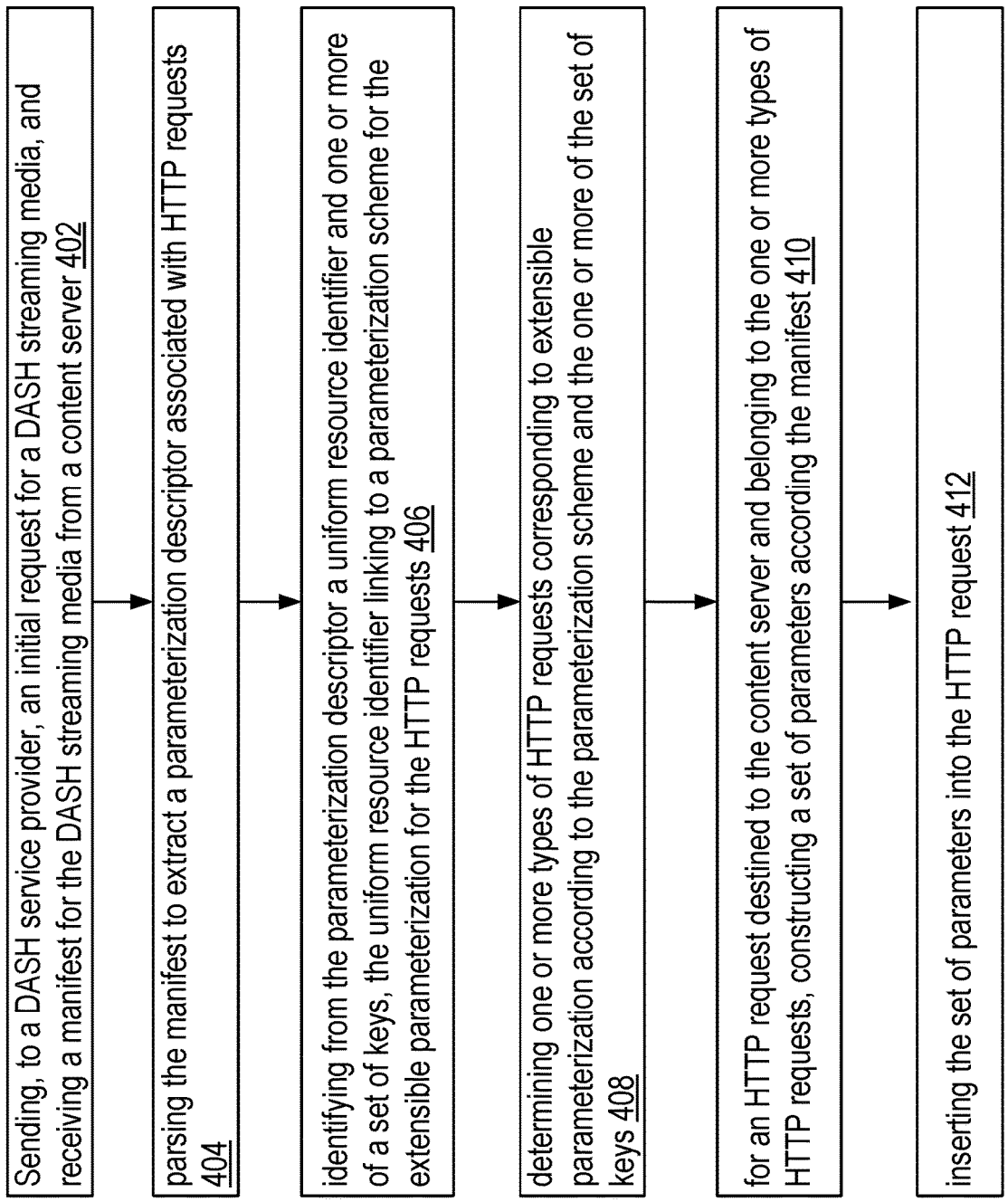
FIG. 4 illustrates an example logic and data flow in a streaming media device for request parameterization.

FIG. 4 shows an example data and logic flow 400 for an extensible parameterization of HTTP requests for a DASH streaming media from a content server. In step 402, a streaming media device may send, to a DASH service provider, an initial request for the DASH streaming media and receive a manifest for the DASH streaming media from the content server. In step 404, the streaming media device may parse the manifest to extract a parameterization descriptor associated with the HTTP requests. In step 406, the streaming media device may identify from the parameterization descriptor a uniform resource identifier and one or more of a set of keys, the uniform resource identifier linking to a parameterization scheme for the extensible parameterization for the HTTP requests. In step 408, the streaming media device may determine one or more types of HTTP requests corresponding to the extensible parameterization according to the parameterization scheme and the one or more of the set of keys. In step 410, for an HTTP request destined to the content server and belonging to the one or more types of HTTP requests, the streaming media device may construct a set of parameters according the manifest. Finally, in step 412, the streaming media device may insert the set of parameters into the HTTP request The techniques described above, can be implemented as computer software using computer-readable instructions and physically stored in one or more computer-readable media. For example, FIG. 5 shows a computer system (500) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 5:
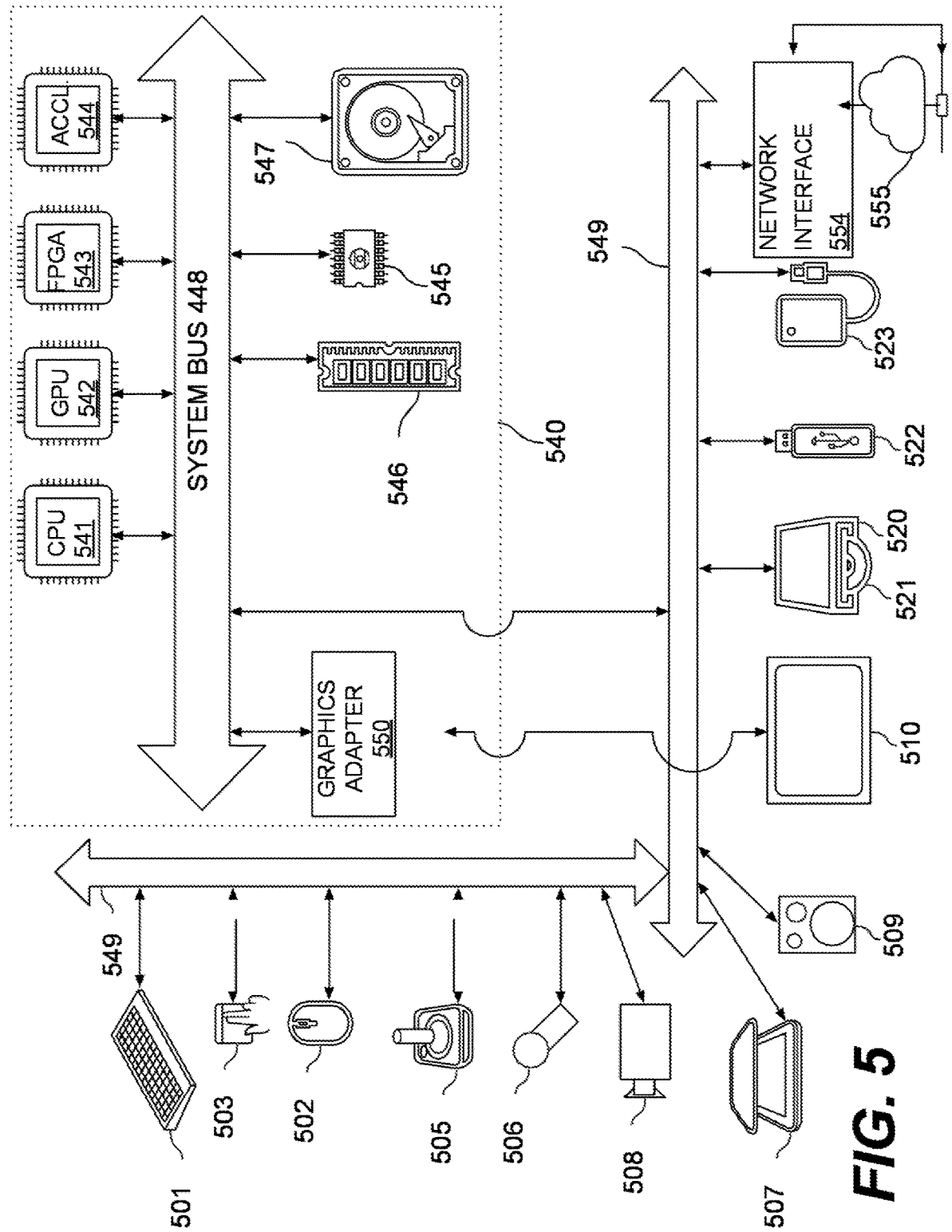
FIG. 5 shows a schematic illustration of a computer system in accordance with example embodiments of the disclosure.

The components shown in FIG. 5 for computer system (500) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (500).

Computer system (500) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (501), mouse (502), trackpad (503), touch screen (510), data-glove (not shown), joystick (505), microphone (506), scanner (507), camera (508).

Computer system (500) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (510), data-glove (not shown), or joystick (505), but there can also be tactile feedback devices that do not serve as input devices), audio output devices (such as: speakers (509), headphones (not depicted)), visual output devices (such as screens (510) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (500) can also include human accessible storage devices and their associated media such as optical media including CD/DVD ROM/RW (520) with CD/DVD or the like media (521), thumb-drive (522), removable hard drive or solid state drive (523), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (500) can also include an interface (554) to one or more communication networks (555). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CAN bus, and so forth. Certain networks commonly require external network interface adapters that attached to certain general-purpose data ports or peripheral buses (549) (such as, for example USB ports of the computer system (500)); others are commonly integrated into the core of the computer system (500) by attachment to a system bus as described below (for example Ethernet interface into a PC computer system or cellular network interface into a smartphone computer system). Using any of these networks, computer system (500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (540) of the computer system (500).

The core (540) can include one or more Central Processing Units (CPU) (541), Graphics Processing Units (GPU) (542), specialized programmable processing units in the form of Field Programmable Gate Areas (FPGA) (543), hardware accelerators for certain tasks (544), graphics adapters (550), and so forth. These devices, along with Read-only memory (ROM) (545), Random-access memory (546), internal mass storage such as internal non-user accessible hard drives, SSDs, and the like (547), may be connected through a system bus (548). In some computer systems, the system bus (548) can be accessible in the form of one or more physical plugs to enable extensions by additional CPUs, GPU, and the like. The peripheral devices can be attached either directly to the core's system bus (548), or through a peripheral bus (549). In an example, the screen (510) can be connected to the graphics adapter (550). Architectures for a peripheral bus include PCI, USB, and the like.

CPUs (541), GPUs (542), FPGAs (543), and accelerators (544) can execute certain instructions that, in combination, can make up the aforementioned computer code. That computer code can be stored in ROM (545) or RAM (546). Transitional data can also be stored in RAM (546), whereas permanent data can be stored for example, in the internal mass storage (547). Fast storage and retrieve to any of the memory devices can be enabled through the use of cache memory, that can be closely associated with one or more CPU (541), GPU (542), mass storage (547), ROM (545), RAM (546), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As a non-limiting example, the computer system having architecture (500), and specifically the core (540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (540) that are of non-transitory nature, such as core-internal mass storage (547) or ROM (545). The software implementing various embodiments of the present disclosure can be stored in such devices and executed by core (540). A computer-readable medium can include one or more memory devices or chips, according to particular needs. The software can cause the core (540) and specifically the processors therein (including CPU, GPU, FPGA, and the like) to execute particular processes or particular parts of particular processes described herein, including defining data structures stored in RAM (546) and modifying such data structures according to the processes defined by the software. In addition to or as an alternative, the computer system can provide functionality as a result of logic hardwired or otherwise embodied in a circuit (for example: accelerator (544)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method by a media streaming device for an extensible parameterization of HTTP requests for a Dynamic Adaptive Streaming over HTTP (DASH) streaming media from a content server, comprising:
    sending, to a DASH service provider, an initial request for the DASH streaming media;
    receiving a manifest for the DASH streaming media from the content server;
    parsing the manifest to extract a parameterization descriptor associated with the HTTP requests;
    identifying from the parameterization descriptor a uniform resource identifier and one or more of a set of keys, the uniform resource identifier linking to a parameterization scheme for the extensible parameterization for the HTTP requests;
    determining one or more types of HTTP requests corresponding to the extensible parameterization according to the parameterization scheme and the one or more of the set of keys;
    for an HTTP request destined to the content server and belonging to the one or more types of HTTP requests, constructing a set of parameters according the manifest; and
    inserting the set of parameters into the HTTP request,
    wherein the HTTP requests comprises HTTP GET requests and the parameterization scheme comprises definition of the set of keys.

2. The method of claim 1, wherein the uniform resource identifier comprises a uniform resource locator (URL) or uniform resource name (URN).

3. The method of claim 2, wherein the one or more types of HTTP requests comprise at least one of:
    a media segment HTTP request type;
    a manifest HTTP request type;
    a xlink HTTP request type;
    a callback HTTP request type of triggering callback events; or
    a chaining HTTP request for chained-to manifest.

4. The method of claim 1, wherein determining the one or more types of HTTP requests needing parametrization comprises using the one or more of the set of keys included in the manifest and the definition of the set of keys to identify the one or more types of HTTP requests.

5. The method of claim 1, wherein the parameterization descriptor comprises a first parameterization selection string, the first parameterization selection string comprising the uniform resource identifier followed by the one or more of the set of keys.

6. The method of claim 5, wherein the parameterization descriptor further comprises a second parameterization selection string, the second parameterization selection string comprises a hard-coded identification string representing selection of a predefined type of HTTP GET requests for parameterization.

7. The method of claim 1, wherein at least one of the set of parameters is specified by the manifest as dynamic.

8. The method of claim 7, wherein the at least one of the set of parameters specified as being dynamic requires adaptive computation by the media streaming device.

9. A media streaming device for implementing an extensible parameterization of HTTP requests for adaptive streaming of a DASH streaming media from a content server, the media streaming device comprising a memory for storing instructions and a processor for executing the instructions to:
    send, to a DASH service provider, an initial request for the DASH streaming media;
    receive a manifest for the DASH streaming media from the content server;
    parse the manifest to extract a parameterization descriptor associated with the HTTP requests;
    identify from the parameterization descriptor a uniform resource identifier and one or more of a set of keys, the uniform resource identifier linking to a parameterization scheme for the extensible parameterization for the HTTP requests;
    determine one or more types of requests corresponding to the extensible parameterization according to the parameterization scheme and the one or more of the set of keys;

for an HTTP request destined to the content server and belonging to the one or more types of requests, construct a set of parameters according the manifest; and insert the set of parameters into the HTTP request, wherein the HTTP requests comprises HTTP GET requests and the parameterization scheme comprises definition of the set of keys.

10. The media streaming device of claim 9, wherein the uniform resource identifier comprises a uniform resource locator (URL) or uniform resource name (URN).

11. The media streaming device of claim 10, wherein the one or more types of HTTP requests comprise at least one of:
a media segment HTTP request type;
a manifest HTTP request type;
a xlink HTTP request type;
a callback HTTP request type of triggering callback events; or
a chaining HTTP request for chained-to manifest.

12. The media streaming device of claim 9, wherein determining the one or more types of HTTP requests needing parametrization comprises using the one or more of the set of keys included in the manifest and the definition of the set of keys to identify the one or more types of HTTP requests.

13. The media streaming device of claim 9, wherein the parameterization descriptor comprises a first parameterization selection string, the first parameterization selection string comprising the uniform resource identifier followed by the one or more of the set of keys.

14. The media streaming device of claim 13, wherein the parameterization descriptor further comprises a second parameterization selection string, the second parameterization selection string comprises a hard-coded identification string representing selection of a predefined type of HTTP GET requests for parameterization.

15. The media streaming device of claim 9, wherein at least one of the set of parameters is specified by the manifest as dynamic, and the at least one of the set of parameters specified as being dynamic requires adaptive computation by the media streaming device.

16. A non-transitory computer-readable storage medium for storing instructions, the instructions when executed by a processor of a media streaming device for implementing an extensible parameterization of HTTP requests for adaptive streaming of a DASH streaming media from a content server, are configured to cause the media streaming device to:

sending, to a DASH service provider, an initial request for the DASH stream media;
receive a manifest for the DASH streaming media from the content server;
parse the manifest to extract a parameterization descriptor associated with the HTTP requests;
identify from the parameterization descriptor a uniform resource identifier and one or more of a set of keys, the uniform resource identifier linking to a parameterization scheme for the extensible parameterization for the HTTP requests;
determine one or more types of HTTP requests corresponding to the extensible parameterization according to the parameterization scheme and the one or more of the set of keys;
for an HTTP request destined to the content server and belonging to the one or more types of HTTP requests, construct a set of parameters according the manifest; and
insert the set of parameters into the HTTP request,
wherein the HTTP requests comprises HTTP GET requests and the parameterization scheme comprises definition of the set of keys.

* * * * *